Feb. 2, 1926.
S. G. DOWN
1,571,247
AUTOMOBILE BRAKE
Filed March 11, 1924
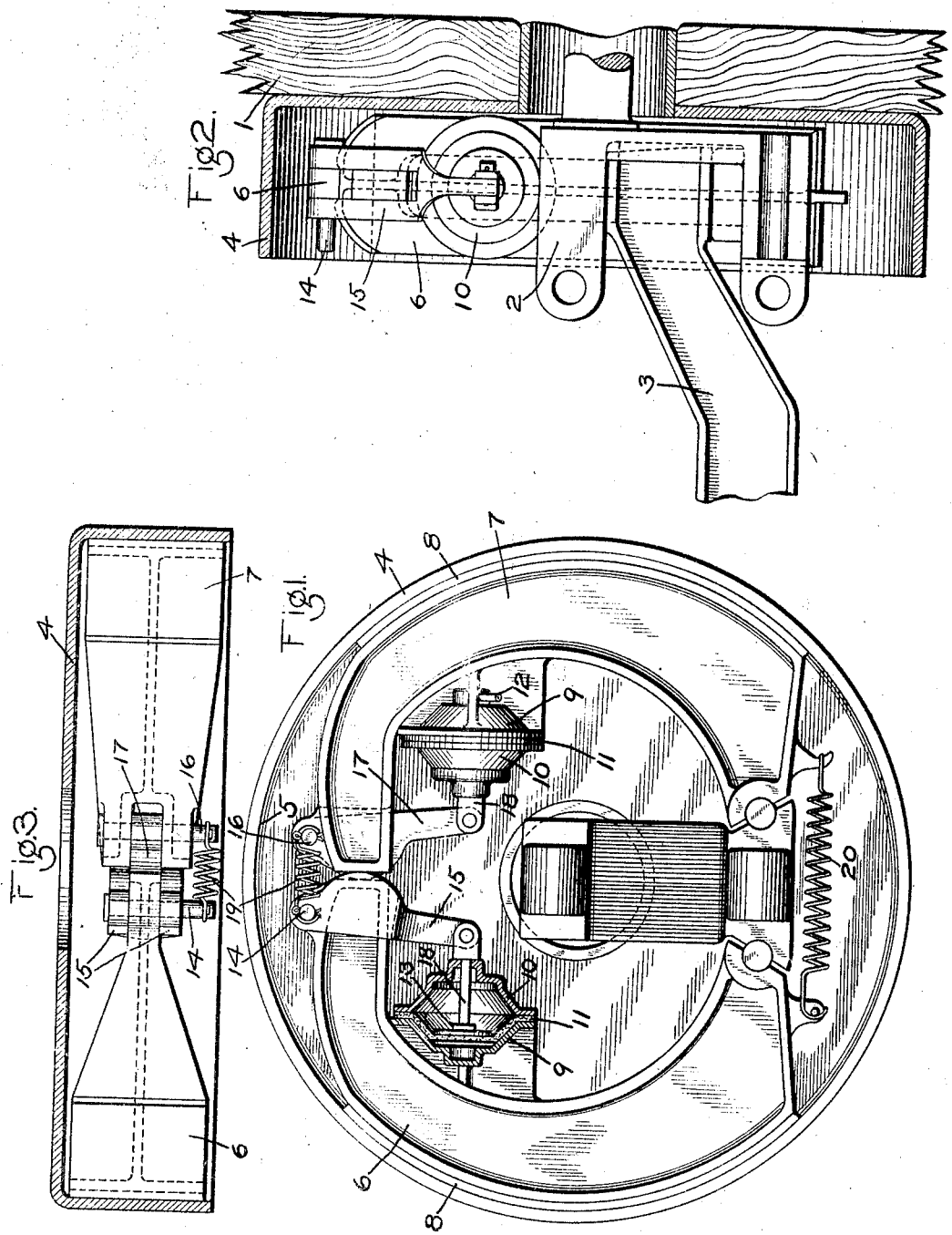
INVENTOR
SIDNEY G. DOWN
BY Wm. M. Cady
ATTORNEY Patented Feb. 2, 1926.

1,571,247

UNITED STATES PATENT OFFICE.

SIDNEY G. DOWN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMOBILE BRAKE.

Application filed March 11, 1924. Serial No. 698,511.

*To all whom it may concern:*

Be it known that I, SIDNEY G. DOWN, a citizen of the United States, residing at Pittsburgh, in the county of Allegheny and State of Pennsylvania, have invented new and useful Improvements in Automobile Brakes, of which the following is a specification.

This invention relates to vehicle brakes, and more particularly to a fluid pressure brake for braking the front wheels of a motor vehicle.

The principal object of my invention is to provide an improved front wheel brake of the above type.

In the accompanying drawing; Fig. 1 is a side elevation of a front wheel fluid pressure brake mechanism embodying my invention; Fig. 2 a central vertical section of the construction shown in Fig. 1; and Fig. 3 a plan view thereof, with the brake drum in section.

As shown in the drawing, the reference numeral 1 indicates a front wheel of a motor vehicle, which is associated with the usual steering knuckle 2, carried by the front axle 3. A brake drum 4 having an internal friction face 5 is secured to the front wheel 1 and mounted in said drum are brake heads 6 and 7, each having a brake shoe 8 adapted to engage the friction face 5 of the brake drum 4.

Preferably formed as a part of each brake head 6 and 7 is a brake chamber casing section 9 having a flanged periphery, each casing being disposed at the inner face of the brake head with their central axes in horizontal alinement. A flanged cover plate 10 is provided for each casing section and secured between the flanges of the casing section and the cover plate is a flexible diaphragm 11.

A fluid pressure supply and release pipe 12 is connected to the chamber at one side of each diaphragm 11 and a pressure plate 13 engages the opposite side of each diaphragm.

Pivotally mounted on a pin 14, secured to the free end of the brake head 6 is a lever 15, the end portion of which is forked to enclose the free end of the brake head 6 and pivotally mounted on a pin 16, secured to the free end of brake head 7 is a lever 17 which is mounted between the forked ends of said brake head.

The forked ends of the lever 15 are provided with arcuate faces adapted to engage the end faces of the forked ends of the brake head 7 and the lever 17 is provided with an arcuate face adapted to engage the end face of the brake head 6. The levers 15 and 17 are pivotally connected to a push rod 18, secured to the pressure plate 13 of the corresponding brake chamber.

When fluid under pressure is supplied through the pipes 12 to the corresponding diaphragms 11, said diaphragms are forced outwardly, causing the push rods 18 to move outwardly, so that the levers 15 and 17 are actuated to spread the free ends of the brake heads 6 and 7. The brake heads are thus expanded so that the brake shoes 8 engage the internal friction face 5 of the drum 4 to effect an application of the brakes.

When fluid under pressure is released from the diaphragms 11, the release springs 19 and 20 operate to effect the movement of the brake heads and the operating parts to release position, so as to release the brakes.

The above described construction provides a compact, self-contained front wheel fluid pressure brake in which the brake chambers are entirely disposed within the brake drum.

Having now described my invention, what I claim as new and desire to secure by Letters Patent, is:

1. In a vehicle brake, the combination with a brake drum and brake heads mounted in said drum, of a fluid pressure brake chamber carried by each brake head, a lever mounted at the free end of each brake head, and a movable abutment in each brake chamber operatively connected to one of said levers.

2. In a vehicle brake, the combination with a brake drum and brake heads mounted in said drum, of a fluid pressure brake chamber carried by each brake head, a lever mounted at the free end of each brake head and adapted to engage the free end of the other brake head, and a movable abutment in each brake chamber operatively connected to each of said levers.

3. In a vehicle brake, the combination with a brake drum and brake heads mounted in said drum, of a fluid pressure brake chamber carried by each brake head, a lever mounted at the free end of each brake head and adapted to engage the free end of the other brake head, a movable abutment in each brake chamber, and a push rod operable by each abutment and connected to each of said levers.

4. In a vehicle brake, the combination with a brake drum and brake heads mounted in said drum, of a fluid pressure brake chamber associated with each brake head and comprising a casing section integral with each brake head, a movable abutment in said chamber, and a push rod operated by said abutment, and a lever carried by each brake head for engaging the free end of the other brake head and operatively connected to a corresponding push rod.

In testimony whereof I have hereunto set my hand.

SIDNEY G. DOWN.